United States Patent
Faramarzi

(10) Patent No.: US 10,027,617 B2
(45) Date of Patent: Jul. 17, 2018

(54) SYSTEMS AND METHODS FOR COMMUNICATION OF USER COMMENTS OVER A COMPUTER NETWORK

(71) Applicant: AVA Info Tech Inc., Woodland Hills, CA (US)

(72) Inventor: Nariman Faramarzi, Chatsworth, CA (US)

(73) Assignee: AVA Info Tech Inc., Woodland Hills, CA (US)

(*) Notice: Subject to any disclaimer, the term of this patent is extended or adjusted under 35 U.S.C. 154(b) by 237 days.

(21) Appl. No.: 14/978,696

(22) Filed: Dec. 22, 2015

(65) Prior Publication Data

US 2016/0182438 A1 Jun. 23, 2016

Related U.S. Application Data

(60) Provisional application No. 62/096,056, filed on Dec. 23, 2014.

(51) Int. Cl.
*G06F 15/16* (2006.01)
*H04L 12/58* (2006.01)
(Continued)

(52) U.S. Cl.
CPC ............ *H04L 51/32* (2013.01); *G06Q 50/01* (2013.01); *H04L 29/08072* (2013.01)

(58) Field of Classification Search
CPC ... H04L 29/08072; H04L 29/06; H04L 51/32; H04L 67/02
(Continued)

(56) References Cited

U.S. PATENT DOCUMENTS 8,341,167 B1 * 12/2012 Podgorny ......... G06F 17/30976
707/758
8,380,732 B2 2/2013 Fishkin et al.
(Continued)

FOREIGN PATENT DOCUMENTS

WO 2012129336 A1 9/2012
WO 2014057295 A1 4/2014

OTHER PUBLICATIONS

New online comment system to keep conversations rolling—Fitzpatrick, Tim, Oct. 30, 2010.

*Primary Examiner* — Khanh Dinh
(74) *Attorney, Agent, or Firm* — Chernoff Vilhauer LLP

(57) ABSTRACT

Systems and methods for communication of user comments over a computer network are provided. Users may place and review comments on webpages or other resources without the resources necessarily expressly incorporating such commenting systems and methods. User comments may be associated with particular elements of resources (e.g. links, videos, pictures, text, HTML tags). Comments may be displayed to the user based on the position of their associated elements. Commenting systems and methods according to the present disclosure may flexibly associate comments with particular elements based on metadata such as one or more attributes of an element, so as to account for changes in resources over time. Users may review comments left by other users, and users' view of other users' comments may be restricted based on visibility settings. User activity profiles comprising displays of user activity across multiple unrelated resources may be provided.

22 Claims, 8 Drawing Sheets

(51) Int. Cl.
*G06Q 50/00* (2012.01)
*H04L 29/08* (2006.01)

(58) Field of Classification Search
USPC ......... 709/203, 220, 224, 227, 228; 370/352
See application file for complete search history.

(56) References Cited

U.S. PATENT DOCUMENTS

| | | | |
|---|---|---|---|
| 8,402,357 B1 | 3/2013 | Norwood et al. | |
| 8,533,238 B2 | 9/2013 | Yu et al. | |
| 8,676,913 B1 | 3/2014 | Roche et al. | |
| 8,676,937 B2* | 3/2014 | Rapaport | H04L 51/32 709/219 |
| 8,745,067 B2 | 6/2014 | Cierniak et al. | |
| 9,323,836 B2* | 4/2016 | Freeman | G06F 17/30702 |
| 2003/0204490 A1 | 10/2003 | Kasriel | |
| 2004/0049534 A1 | 3/2004 | Nickerson et al. | |
| 2008/0065649 A1 | 3/2008 | Smiler | |
| 2009/0222551 A1* | 9/2009 | Neely | G06F 17/30864 709/224 |
| 2010/0095198 A1 | 4/2010 | Bultrowicz et al. | |
| 2010/0121857 A1* | 5/2010 | Elmore | G06F 17/30702 707/748 |
| 2010/0161631 A1 | 6/2010 | Yu et al. | |
| 2011/0264734 A1* | 10/2011 | Yoshida | G06F 17/30241 709/203 |
| 2012/0150997 A1 | 6/2012 | McClements, IV | |
| 2012/0159635 A1 | 6/2012 | He et al. | |
| 2012/0290950 A1* | 11/2012 | Rapaport | H04L 51/32 715/753 |
| 2014/0344718 A1* | 11/2014 | Rapaport | H04L 51/32 715/753 |

\* cited by examiner

SYSTEMS AND METHODS FOR COMMUNICATION OF USER COMMENTS OVER A COMPUTER NETWORK

RELATED APPLICATIONS

This application claims priority from, and the benefit of 35 USC § 119(e) in respect of, U.S. application No. 62/096,056 filed 23 Dec. 2014, which is hereby incorporated herein by reference.

FIELD

This invention relates to systems and methods for communication over a computer network, and in particular to systems and methods for managing user comments.

BACKGROUND

Websites, such as those accessible via the Internet, intranets, and/or other computer networks, often provide commenting systems by which users may review comments left by other users and/or may add comments which are reviewable by other users. Typically, such commenting systems comprise a commenting user interface in an area defined by a webpage provided by the website. Comments received on a webpage are commonly managed by a commenting system specifically provided by the webpage (e.g. by providing a commenting system on the server hosting the webpage or by expressly incorporating a commenting system provided by a remote server).

A consequence of such commenting systems is that each website may provide a different commenting system, requiring users to learn multiple user interface conventions and potentially introducing multiple points of failure in the event of a malfunction of one or more hosting computer systems. Further, since each website must take explicit action on each webpage to provide a commenting system on that webpage, certain websites, and/or certain webpages within a website, may not provide commenting systems at all.

Accordingly, there is a general desire to provide improved commenting systems on a computer network and/or commenting systems which ameliorate at least some of the deficiencies discussed above and/or other deficiencies.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Systems according to particular embodiments may comprise a processor configured to perform such methods for communication of user comments over a computer network. Non-transitory computer-readable media may be provided with instructions, which (when executed by a suitably configured processor), cause the processor to perform such methods.

According to another aspect of the invention, the methods described herein are encoded on computer readable media and which contain instructions executable by a processor to cause the processor to perform one or more of the methods described herein.

According to another aspect of the invention, systems are provided wherein processors are configured to perform one or more of the methods described herein.

Further aspects and example embodiments are illustrated in the accompanying drawings and/or described in the following description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
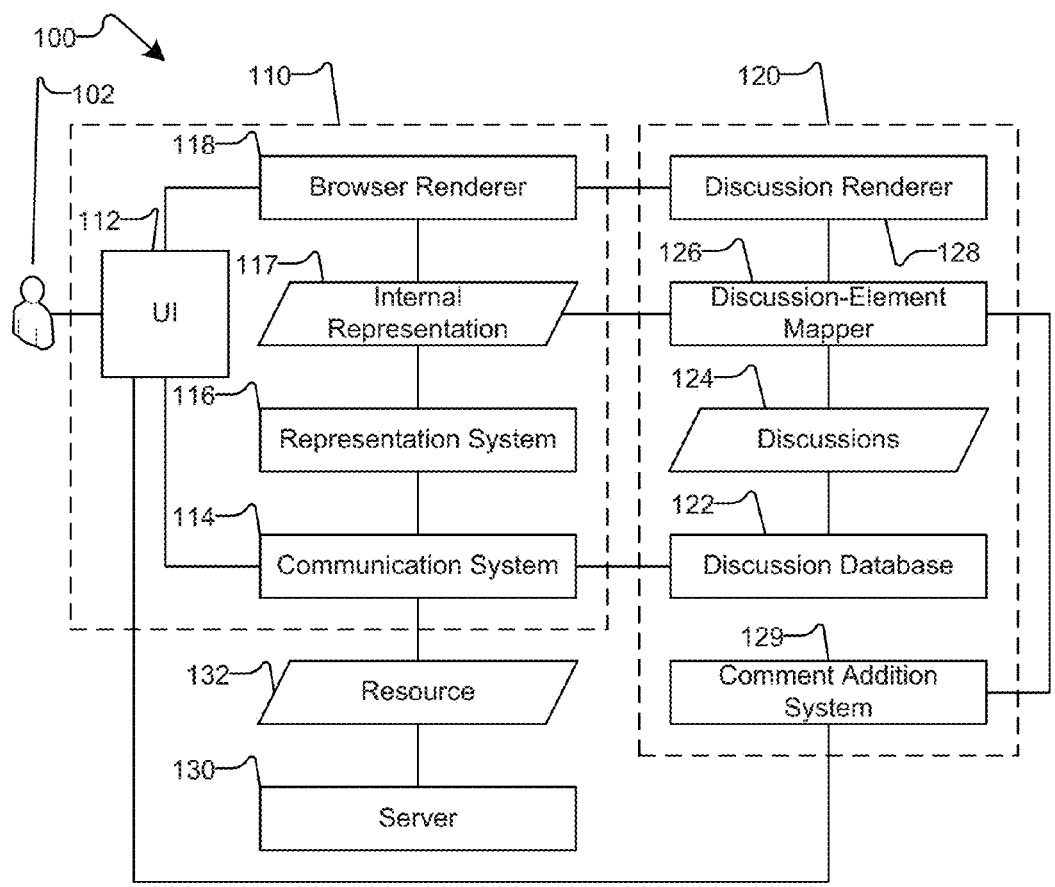
FIG. 1 is a schematic representation of an example computer system for providing a commenting system according to a particular embodiment of the present disclosure.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Methods described herein are implemented by suitably configured computers and/or suitably configured processors. Throughout the disclosure where a processor, computer or computer readable medium is referenced such a reference may include one or more processors, computers or computer readable media in communication with each other through one or more networks or communication mediums. The one or more processors and/or computers may comprise any suitable processing device, such as, for example, application specific circuits, programmable logic controllers, field programmable gate arrays, microcontrollers, microprocessors, computers, virtual machines and/or electronic circuits. The one or more computer readable media may comprise any suitable memory devices, such as, for example, random access memory, flash memory, read only memory, hard disc drives, optical drives and optical drive media, or flash drives. Further, where a communication to a device or a direction of a device is referenced it may be communicated over any suitable electronic communication medium and in any suitable format, such as, for example, wired or wireless mediums, compressed or uncompressed formats, encrypted or unencrypted formats.

One or more processors and/or computers in communication with each other through one or more networks or communication mediums may be collectively or individually referred to herein as a "computer system". Actions performed by a computer system may be understood to be performed by one or more processors, and/or may be understood to be performed by other components of one or more computers in the computer system (e.g. at an input device such as a keyboard, touch screen, computer mouse, etc.; at an output device such as a display, an audio speaker, a haptic feedback motor, etc.; and/or at other components).

Aspects of the present disclosure provide systems and methods for communication of user comments over a computer network. These commenting systems and methods allow users to place and review comments on network-accessible resources (such as webpages) even when such resources do not expressly incorporate such commenting systems and methods. User comments may be associated with particular elements of resources, such as links, videos, pictures, textual elements, HTML tags, audio content, etc. Comments may be displayed to the user based on the "position" of their associated elements (e.g. the position of (and/or within) the associated element within a webpage or other network-accessible resource and/or the time within a video or audio elements). Commenting systems and methods according to the present disclosure may flexibly associate comments with particular elements based on metadata such as one or more attributes of an element, so as to account for changes in resources over time. Such commenting systems and methods may group comments into "discussions". Each comment may be associated with a discussion, and each discussion may be associated with a resource and/or an element within a resource (e.g. based on metadata, as described above).

Such commenting systems and methods may allow users to review comments left by other users, and may restrict the ability of users to view the comments of other users based on visibility data associated with such comments and the corresponding visibility of such comments on the resource. Such commenting systems and methods may provide user activity profiles comprising displays of user activity across multiple unrelated resources.

Such commenting systems and methods may allow users to comment on interactive and/or multimedia content (elements) of any website attaching the comment to a particular part of the multimedia content or any specific position within the multimedia content. For instance, a user could insert a comment at any given time/position of a video or audio clip (x seconds) to another time/position (x seconds+y seconds) wherein the video or audio clip is present on any (including third party) website. To make such a comment and to make such a comment visible to other users, a user need not need upload the multimedia on any other host. Such commenting systems and methods may enable a user to place one or more comments on any multimedia content at source and/or start a discussion with public or the followers.

Systems according to particular embodiments may comprise a processor configured to perform such methods for communication of user comments over a computer network. Non-transitory computer-readable media may be provided with instructions, which (when executed by a suitably configured processor), cause the processor to perform such methods.

FIG. 1 shows a computer system 100 according to an example embodiment of the present disclosure. A user 102 interacts with a browser 110 to retrieve a resource 132 from a server 130. Comment system 120 interacts with browser 110 to retrieve discussions, map discussions to elements of resource 132, render comments for review by user 102, and receive additional comments from user 102. In some embodiments, browser 110 comprises a web browser, server 130 comprises a web server, resource 132 comprises a webpage (e.g. in HTML format), and comment system 120 comprises a plug-in which extends the functionality of browser 110. In some embodiments, comment system 120 comprises a JavaScript library incorporated into resource 132 and/or otherwise invoked by browser 110. In some embodiments, at least part of comment system 120 is provided directly by browser 110 as native functionality (which may or may not need to be enabled by a user). In some embodiments, at least part of comment system 120 is provided by a server with which browser 110 is in communication. For example, in a currently-preferred embodiment, discussion database 122 is hosted on a server. The server communicates with a remote computer system hosting browser 110 (e.g. via a browser plug-in or otherwise, as described herein).

User 102 interacts with user interface 112 of browser 110. Via user interface 112, user 102 may direct browser 110 to retrieve a resource 132 from a server 130. For example, browser 110 may provide an address bar where user 102 may input an address for server 130 and/or resource 132. As another example, browser 110 may provide other control elements to user 102 which allow user 102 to navigate browser 110 to one or more resources; for instance, browser 110 may provide links which a user may select to navigate to particular address. For example, user 102 may provide the address "www.example.com" by typing such an address into an address bar, selecting a link, and/or via other controls.

In response to receiving a direction from user 102, browser 110 may direct communication system 114 to resolve the address (e.g. to an IP address), contact server 130, and retrieve resource 132. Resource 132 may be parsed by a representation system 116 to generate an internal representation 117. For example, resource 132 may comprise an HTML, XHTML, or XML document which is parsed by representation system 116 to generate a tree-structure internal representation 117 (e.g. a document object model tree). As another example, representation system 116 may comprise a JavaScript engine which generates a JavaScript data structure as internal representation 117.

Browser 110 renders resource 132 for user 102 via browser renderer 118, and provides the rendered resource 132 to user 102 via user interface 112. For example, browser renderer 118 may generate a graphical representation of resource 132 based on internal representation 117 (and/or directly from resource 132 and/or from an intermediate or other representation of resource 132) and user interface 112 may display the generated graphical representation to user 102 via a display (e.g. a monitor, screen, etc.). Browser renderer 118 may generate graphical, audio, tactile, and/or other representations to be provided to user 102 by user interface 112.

The functionality of comment system 120 may be provided in part by browser 110 (e.g. as native functionality and/or as a browser plug-in) and/or comment system 120 may interact with browser 110 to provide comments to user 102 along with the output of browser renderer 118. In the depicted embodiment, communication system 114 of browser 110 is configured to receive discussions 124 associated with elements of resource 132 from discussion database 122 upon being directed to receive resource 132 from server 130. In some embodiments, comment system 120 provides a communication system (not shown) at least partially separate from communication system 114. In the following disclosure, it is assumed that comment system 120 makes use of communication system 114 for communication with discussion database 122 and/or any other communication, unless the context implicitly or explicitly requires otherwise. Each discussion 124 may comprise one or more comments, as described in greater detail below. Throughout this disclosure, except where the context requires otherwise, references to receiving, rendering, and/or otherwise dealing with "comments" may be understood to include receiving, rendering, and/or otherwise dealing with one or more discussions.

In some embodiments, communication system 114 is configured to request from discussion database 122 all discussions 124 associated with resource 132. For example, communication system 114 may provide to discussion database 122 an identifier identifying resource 132, such as a uniform resource locator (URL), uniform resource identifier (URI), uniform resource name (URN), IP address, file name, and/or any other identifier (e.g. a hash of any of the aforementioned identifiers). Discussion database 122 may provide a set of discussions 124 to browser 110 in response to such a request.

In some embodiments, discussions 124 comprise all discussions in discussion database 122 associated with resource 132. In some embodiments, certain discussions in discussion database 122 which are associated with resource 132 may be omitted from discussions 124. For example, each discussion and/or comment in discussion database 122 is associated with visibility data which determines whether user 102 has access to the discussion and/or comment. For instance, user 102 may have access to all comments left by other users who are "friends" of user 102, comments left by other users who "follow" user 102, and/or comments left by other users with "public" visibility, but may not have access to other comments (e.g. comments from other users who do not fit into one of the aforementioned categories). Accordingly, communication system 114 may provide to discussion database 122 an indication of the identity of user 102, in response to which discussion database 122 may provide only discussions 124 which user 102 has access to and which are associated with resource 132.

In some embodiments, one or more discussions 122 are associated with elements within resource 132 (in addition to being generally associated with resource 132). In some such embodiments, certain discussions in discussion database 122 may be determined to be associated with elements which are no longer present in resource 132. Such discussions may optionally be omitted from discussions 124. As described in greater detail below, discussion database 122 may receive an indication (e.g. from mapper 126) that a particular discussion 124 could not be mapped to an element in a particular resource 132 (referred to herein as a "missed indication"). Discussion database 122 may maintain a record of missed indications (e.g. by updating a field in a database record corresponding to the particular discussion 124). Discussion database 122 may omit the particular discussion from the set of discussions 124 provided in response to a subsequent request for discussions 124 associated with resource 132 based on its record of missed indications.

For example, discussion database 122 may omit a particular discussion from discussions 124 if the discussion database 122 has received more than a threshold N number of missed indications. Such a threshold N could be set to, for example, 10, 20, 50, 100, 1000, or any other suitable number. Discussion database 122 may additionally or alternatively require that a threshold amount of time t elapse between a first missed indication being received in respect of a particular discussion and omitting the particular discussion from subsequent discussions 124. For example, discussion database 122 may require that, of the N missed indications received, at least one of the N missed indications was received at least t hours previously.

In some embodiments, discussion database 122 must receive missed indications from at least a threshold U of users prior to omitting the particular discussion from subsequent discussions 124. For example, discussion database 122 may require that it received missed indications from at least U=80% of all users requesting discussions associated with resource 132. Discussion database 122 may alternatively, or additionally, require that it receive missed indications from at least a fixed number (e.g. U=10) of users. For example, U may be determined to be the greater of a percentage-based threshold and a fixed threshold. For instance, U may be determined according to the formula U=max(0.8×R, 10), where R is the number of users who have requested discussions of resource 132.

In some embodiments, discussion database 122 determines whether or not to omit a particular discussion from discussions 124 based on missed indications received over a period of time. For example, discussion database 122 may consider only missed indications received over the last hour (or day, or any other suitable time period) when determining whether to omit a particular discussion. For instance, computer system 100 may generate a report after rendering discussions associated with any resource 132, and this report may include missed indications. Such reports may be sent to, for example, discussion database 122. If a threshold U of reports within a time period include missed indications relating to a particular discussion, that discussion may be omitted from subsequent sets of discussions 124. For example, if at least 80% of all reports generated within the previous hour including missed indication relating to a particular discussion, that discussion may be omitted from subsequent sets of discussions 124.

In some embodiments, discussion database 122 is provided by one or more servers remote from browser 110 and/or server 130. In some embodiments, all or part of discussion database 122 is provided by server 130 and/or a computer system hosting browser 110. For example, discussion database 122 may be locally co-hosted with browser 110.

Comment system 120 maps discussions 124 to elements of resource 132 using mapper 126. In the depicted embodiment, mapper 126 compares each discussion 124 with elements in internal representation 117. In some embodiments, mapper 126 may compare discussions 124 to elements of resource 132 directly, and/or from an intermediate or other representation of resource 132. Mapper 126 may determine whether each discussion 124 is associated with a unique element of internal representation 117 and, if so, which elements such discussions 124 are uniquely associated with. Mapper 126 may, alternatively, or in addition, determine whether each discussion 124 is associated with multiple elements of internal representation 117 and, if so, which elements such discussions 124 are associated with. Methods by which mapper 126 may associate discussions 124 with elements of internal representation 117 are discussed in greater detail below.

Mapper 126 provides a discussion-element mapping to discussion renderer 128. Discussion renderer 128 provides a rendering of discussions 124 to user 102 by way of user interface 112. In some embodiments, discussion renderer 128 determines rendering information of discussions 124 to browser renderer 118. For example, discussion renderer 128 may determine a location in a graphical representation of resource 132 generated by browser renderer 118 at which a discussion 124 is to be displayed. For instance, a discussion associated with an image element in resource 132 may be graphically represented by indicia placed at the top-left corner of that image element. Coordinates corresponding to the top-left corner of the image element may be communicated to browser renderer 118 by discussion renderer 128 along with criteria for graphically rendering the indicia representing the discussion. Browser renderer 118 may then generate a composite rendering of resource 132 and discussions 124 according to the rendering information provided by discussion renderer 128.

Graphical representations of discussions need not be restricted to the top-left corner of an element. For example, a discussion associated with an element in resource 132 may be graphically represented by indicia placed at the center of that element, along a boundary of the element, outside of the element, and/or at any arbitrary location relative to the element (e.g. offset from the top-left corner of the image element by 20 pixels horizontally and 10 pixels vertically). For instance, a discussion associated with an image element may be graphically represented by indicia placed on or near to the face of a person depicted in the image. The particular location may be chosen by a user. As another example, where the element in resource 132 has a temporal aspect (e.g. an audio and/or video element), the discussion may be mapped to a particular time within the element.

In some embodiments, discussion renderer 128 generates a rendering of discussions 124 according to mapping 126 and overlays this rendering on the rendering of browser renderer 118.

In some circumstances, mapper 126 may be unable to uniquely associate each discussion 124 with an element of internal representation 117. In such circumstances, mapper 126 may determine that discussions 124 without associated unique elements are "missed" discussions. In some embodiments, missed discussions are rendered by discussion renderer 128. Comment system 120 may provide an indication to discussion database 122 (e.g. via communication system 114) that a particular discussion 124 was missed. In some embodiments, user 102 may have the option of viewing missed discussions 124; such discussions 124 may, for example, be provided through a portion of user interface 112 reserved for the display of missed discussions 124. For example, user interface 112 may provide a separate window or tab, an additional graphical element overlaid on the rendering of browser renderer 118 (e.g. a floating control, a collapsible tray, etc.), an audio cue, and/or other indicia representing missed discussions 124.

Figure 2:
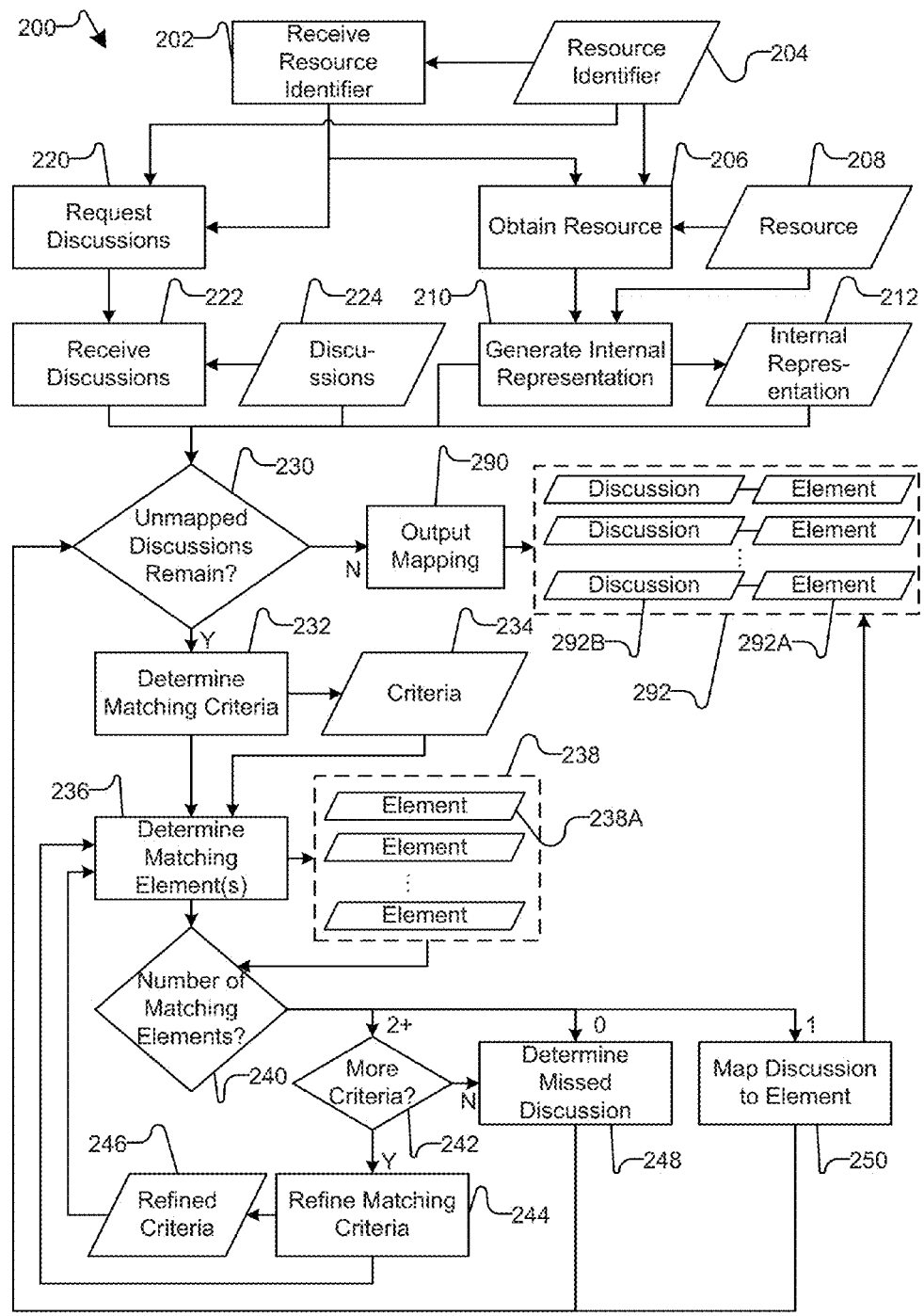
FIG. 2 is a schematic representation of an example comment mapping method according to a particular embodiment of the present disclosure.

FIG. 2 schematically illustrates an example comment mapping method 200 which may be performed by computer system 100 (e.g. at mapper 126) according to a particular embodiment. At step 202, computer system 100 receives a resource identifier 204 from user 102 (e.g. via user interface 112, as described above). As described above, resource identifier 204 may comprise a uniform resource locator (URL), uniform resource identifier (URI), uniform resource name (URN), IP address, file name, and/or any other identifier (e.g. a hash of any of the aforementioned identifiers). Computer system 100 may then proceed to request discussions associated with the resource identified by resource identifier 204 (at step 220) and obtain identified resource 208 (at step 206). In FIG. 2, steps 206 and 220 are shown to be performed in parallel. In some embodiments, steps 206 and 220 are performed sequentially; in such embodiments, either one of steps 206 and 220 may be performed before the other.

At step 206, computer system 100 obtains resource 208. Resource 208 may correspond to resource 132 in FIG. 1. For example, communication system 114 may communicate with server 130 and receive resource 132, as described above. As another example, resource 208 may be stored locally on the computer hosting browser 110 (and, accordingly, communication with server 130 may not be necessary). Once resource 208 has been obtained, computer system 100 may proceed to step 210.

At step 210, computer system 100 generates an internal representation 212 of resource 208. Internal representation 212 may correspond to internal representation 117 in FIG. 1. For example, representation system 116 may generate internal representation 212 based on resource 208, as described above.

At step 220, computer system 100 submits a request to discussion database 122 for discussions 224 associated with the resource identified by resource identifier 204. Discussions 224 may correspond to discussions 124 in FIG. 1. Once discussions 224 have been requested, computer system 100 may proceed to step 222. At step 222, computer system 100 receives the requested discussions 224 from discussion database 122. In some circumstances, discussion database 122 may not store any discussions relating to the resource identified by resource identifier 204 and/or may be unable to provide some or all of discussions 224 (e.g. due to a technical malfunction). Discussion database 122 may provide an indication of this failure instead of, or in addition to, providing discussions 224.

At step 230, computer system 100 determines whether any discussions 224 have yet to be mapped to elements in resource 208 and have not been determined to be missed discussions. If such unmapped and non-missed discussions 224 remain, computer system 100 proceeds to step 232. In circumstances where discussions 224 comprise at least one discussion, computer system 100 will proceed to step 232 at least once for each such discussion in discussions 224.

At step 232, computer system 100 determines one or more matching criteria 234 associated with a particular discussion 224. Matching criteria 234 are used to match elements of resource 208 to the particular discussion 224. Matching criteria 234 may be based on metadata associated with discussions 224. Discussions 224 may comprise such metadata. For example, discussion database 122 may comprise a record for each discussion represented therein, and each record may comprise one or more fields containing metadata describing the discussion corresponding to the record.

Metadata may comprise, for example, data describing the element of resource 208 with which a particular discussion 224 is associated. For example, metadata may comprise a markup tag in HTML, XHTML, or other format corresponding to the element. For instance, a discussion associated with an image in a webpage resource 208 may have associated metadata comprising an <IMG> tag. Metadata may also, or alternatively, comprise attributes of such markup tags, such as (for example) ID attributes, CSS class name attributes, style attributes, title attributes, source (or "SRC") attributes, dimensional attributes (e.g. "HEIGHT", "WIDTH", "SIZE", etc.), and the like. Metadata may also, or alternatively, comprise some or all of the contents of a markup tag. For example, a discussion may be associated with metadata comprising a <P> tag (indicating that the tag contains a paragraph), as well as the textual contents of that paragraph. Textual contents may be stored as metadata with some or all of the markup tags that such text may contain, if any (e.g. <I> tags indicating italics formatting), and/or without such markup tags.

In some embodiments, metadata comprises source ("src") attributes, when available. For example, a discussion may be associated with an <IMG> tag in resource 208. That <IMG> tag may have an associated "SRC" attribute which identifies a location of data which describes an image (e.g. a JPG file). That location may be stored as metadata associated with the corresponding discussion. Similarly, a hyperlink (indicated by an <A> tag) may have an associated "HREF" attribute which identifies a location of a resource and/or anchor element. In some embodiments, such locations are normalized (i.e. fully qualified), so that locations expressed in a relative format (e.g. "/resource.html") are stored as metadata in absolute format (e.g. "http://www.example.com/resource.html"). GET query parameters in resource identifiers may be included in such identifiers, excluded from such identifiers, and/or stored separately from such identifiers as metadata.

In some embodiments, metadata comprises a record of all or part of an element at the time that a discussion 224 associated with that element was created. For example, a discussion associated with an image may be associated with metadata comprising a snapshot of that image at the time that the discussion was created. Metadata may also, or alternatively, comprise information identifying a user who created a discussion, a color associated with a discussion, a graphical location at which to render a discussion (e.g. relative to its associated element, as described above), a date and time at which a discussion was created, and other information.

The step 232 determination of matching criteria 234 may comprise selecting a subset of metadata associated with a particular discussion. Matching criteria 234 may comprise requiring equality with the subset selected. For example, matching criteria 234 may comprise requiring that the matched element have the same element type (e.g. <P>, <IMG>, etc.) as indicated in the discussion's metadata and attributes matching one of more of the attributes (e.g. SRC, ID, NAME, STYLE) indicated in the discussion's metadata. In some embodiments, matching criteria 234 comprise requiring the matched element have the same element type and that all of the attributes indicated in the discussion's metadata match the corresponding attributes of the element. In some embodiments, a subset of the attributes indicated in the discussion's metadata are included in matching criteria 234. For example, matching criteria 234 may comprise requiring that the SRC and ID attributes (if any) of the matched element match the SRC and ID attributes indicated in the discussion's metadata, but may exclude dimensional attributes (such as WIDTH or HEIGHT) and CSS-related attributes (such as NAME and STYLE).

In some embodiments, determining matching criteria 234 at step 232 comprises receiving pre-configured matching criteria 234 (e.g. from a user, from discussion database 122, from a storage device, etc.); in such embodiments, step 232 may be performed by computer system 100 earlier in method 200 (e.g. at step 222 or at another time). Once matching criteria 234 have been determined, computer system 100 may proceed to step 236.

At step 236, matching criteria 234 are applied to elements of resource 208 to generate a set 238 of matching elements 238A. In some embodiments, matching criteria 234 are only applied to elements which are or may become visible (or audible/tactile, as the case may be) to the user. For example, matching criteria 234 may be applied to each element in the BODY section (as opposed to the HEAD section) of an HTML resource 208. The elements which matching criteria 234 are to be applied to are referred to herein as "eligible elements". Computer system 100 may apply matching criteria to elements of resource 208 in sequence and/or in parallel. Each element 238A of set 238 satisfies each of the matching criteria in matching criteria 234.

Once set 238 has been determined, computer system 100 may proceed to step 240. In some embodiments, computer system proceeds to step 240 without applying matching criteria 234 to all eligible elements; for example, once two elements 238A are determined, computer system 100 may proceed to step 240.

At step 240, computer system 100 determines the number of matching elements 238A in set 238. Computer system 100 then proceeds to step 242 if there are 2 or more matching elements 238A in set 238, step 248 if there are no matching elements 238A in set 238, and step 250 if there is one matching element 238A in set 238.

At step 242, computer system 100 determines whether additional criteria could be added to matching criteria 234 to refine the search for an element associated with a particular discussion. For example, if the discussion is associated with metadata describing the element, and if that metadata has not been used as a basis for matching criteria 234, then computer system 100 may determine that additional criteria are available and proceed to step 244. As another example, if metadata which has previously been used as a basis for matching criteria 234 could be used to generate further criteria (e.g. by including GET parameters in a SRC element), then computer system 100 may proceed to step 244.

In some embodiments, if no further criteria are available to refine the search, computer system 100 may proceed to step 248 (i.e. the discussion may be treated as a missed discussion). In some embodiments, computer system 100 may proceed to step 250 and map the discussion to one or more of the matching elements, as described below.

At step 244, computer system 100 determines one or more additional matching criteria to generate refined criteria 246. Refined criteria 246 may comprise the union of additional matching criteria determined at step 244 and matching criteria 234. Alternatively, or in addition, one or more matching criteria 234 may not be included in refined criteria 246 (e.g. as in the case where one or more matching criteria 234 are replaced by one or more additional matching criteria, and/or where one or more matching criteria 234 are otherwise rendered redundant by the additional matching criteria).

For example, if the metadata associated with a particular discussion indicates that its associated element has a SRC, HREF, or other locational attribute (e.g. as in the case of an <IMG> or <A> element in an HTML resource 208), computer system 100 may refine matching criteria 234 to include GET query parameters in the locational attribute, if such parameters were not included at step 232 or on previous iterations of step 244 (if any).

As another example, if the metadata associated with a particular discussion indicate that its associated element contains textual content, computer system 100 may generate refined criteria 246 to include some or all of such textual content referred to herein as ("metadata textual content"). In some embodiments, refined criteria 246 may not require an exact match of metadata textual content and the textual content of an eligible element. For example, refined criteria 246 may compare metadata textual content to the textual content of an element and assign a matching score to each element based on similarities between the metadata textual content and the element's textual content. The matching score may be determined based on, for example, substring analysis (i.e. comparing substrings of metadata textual content to substrings of elements' textual content). Elements with matching scores in excess of a threshold (e.g. greater than 95%) may be determined to match the discussion.

In some embodiments, refined criteria 246 may comprise a subset of metadata textual content; for example, refine criteria 246 may require that a matching element contain the first 140 characters of the metadata textual content. If such refined criteria 246 fails to produce a unique matching element 238A, further refine criteria 246 may be determined (e.g. by requiring that a matching element contain more than the first 140 characters of the metadata textual content).

Once refined criteria 246 have been determined, computer system 100 may proceed to step 236 and repeat the above-described process to generate a new set 238 of matching elements 238A. Eventually, once set 238 no longer contains two or more elements 238A, or once no further refinements of criteria 236, 246 are available, computer system 100 will proceed to step 248 or step 250.

At step 248, computer system 100 determines that no elements of resource 208 match the discussion in question. Computer system 100 may record this determination, such as by providing a missed indication to discussion database 122, as described above. Computer system 100 may then proceed to step 230 and repeat the process described above on further discussions (if available).

In some embodiments, computer system 100 may attempt to vary criteria 234, 246 at step 248. For example, if matching criteria 234 comprise attributes of an HTML tag (e.g. ID, NAME, and STYLE attributes of a <P> tag), and refined criteria 246 were subsequently generated to comprise matching criteria 234 and also textual content, computer system 100 may vary refined criteria 246 to comprise only the textual content (and/or a subset of the textual content), at which point computer system 100 may proceed to step 236 to generate a new set 238.

At step 250, computer system 100 maps the matching element 238A to the discussion in question. This pairing is added to mapping 292 as a paired element 292A and discussion 292B (described below). Computer system 100 may then proceed to step 230 and repeat the process described above on further discussions (if available).

As noted above, in some embodiments the discussion is mapped to multiple matching elements 238A. For example, the discussion may be mapped to each matching element 238A (and may be rendered relative to one or more such elements). As another example, computer system 100 may determine a ranking of matching elements 238A and map the discussion to the highest-ranked element, to all elements with a rank which exceeds a threshold, and/or the like.

Returning to step 230, if all discussions 224 have been mapped to elements in resource 208 or have been determined to be missed, computer system 100 proceeds to step 290. At step 290, computer system 100 outputs a mapping 292 comprising pairs of discussions 292B and elements 292A. "Output" includes providing mapping 292 to a component of computer system 100, such as discussion renderer 128.

Computer system 100 may render discussions 292B (e.g. at discussion renderer 128 and/or browser renderer 118 of FIG. 1) based on mapping 292 and may provide the rendering of mapped discussions 292B to a user via user interface 112, as described above. Mapped discussions 292B may be rendered along with some or all of their associated metadata. For example, mapped discussions 292B which are associated with metadata comprising a snapshot of an image may be rendered along with such a snapshot. As another example, mapped discussions 292B may be rendered along with an indication of the time and date on which the discussion was created.

Figure 2A:
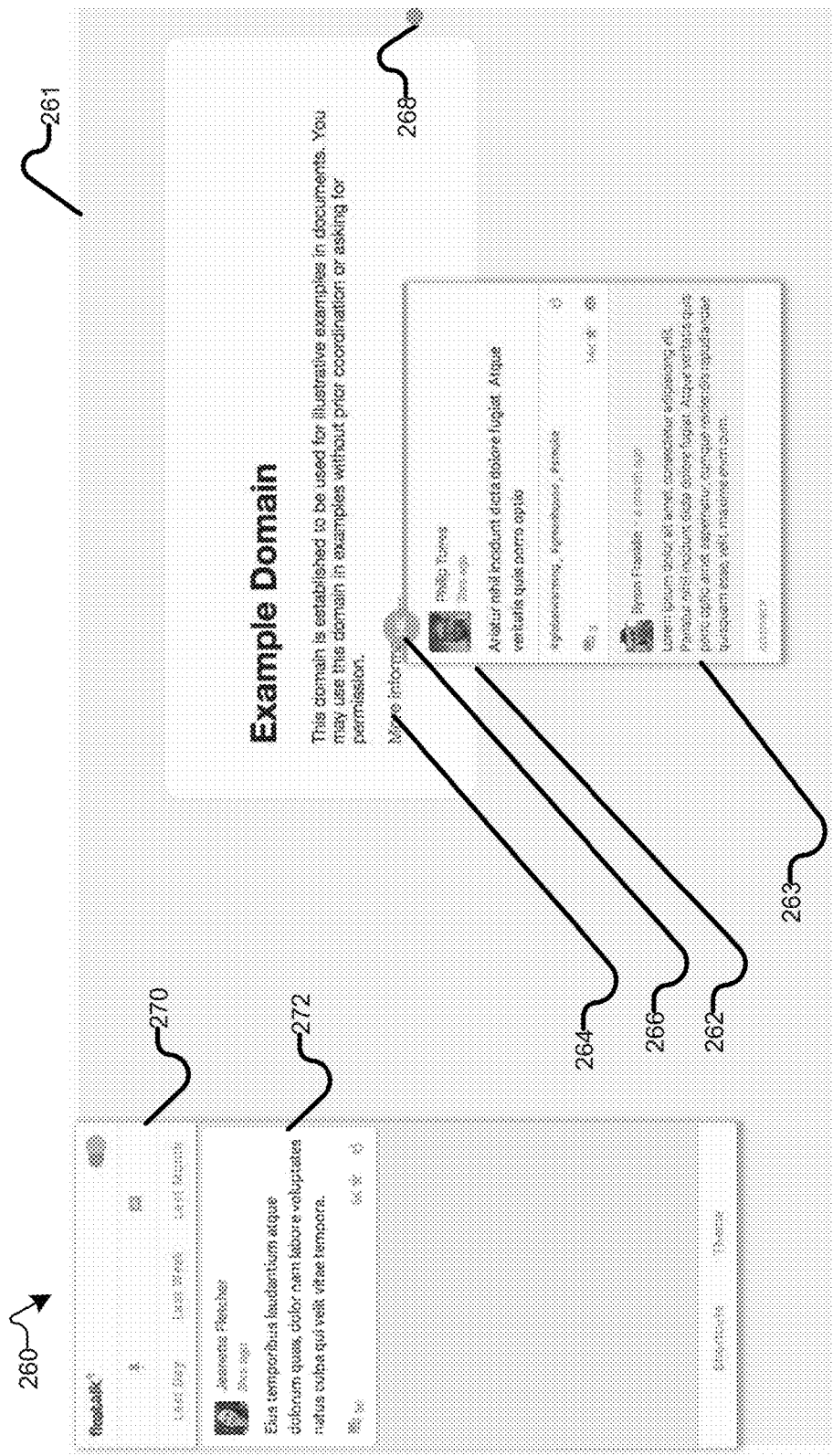
FIG. 2A is an example rendering of discussions on an example webpage according to a particular embodiment of the present disclosure.

FIG. 2A illustrates an example of a rendering 260 of discussions 292B. An example webpage 261 is shown with rendered discussion 262. Discussion 262 is expanded to display at least some of the comments 263 associated with discussion 292B (such comments 263 are referred to herein as being "in" discussion 202). Discussion 262 is displayed relative to its associated element 264 (in this example, hyperlink). Discussion 262 may include indicia 266. Discussion 262 may be collapsed so that its comments 263 are not visible; when collapsed, indicia 206 may continue to be visible. Indicia 266 is positioned relative to element 264; if element 264 is positioned in a different location on a subsequent viewing of webpage 261, indicia 266 may likewise be moved to maintain its relative position to element 264. Additional indicia 268 may be displayed along a margin of webpage 261 at positions corresponding to the (in this example) vertical position of discussions 262. Each discussion 262 may have an associated color, and discussions 262 and their corresponding indicia 266 and/or 268 may be rendered in those colors (e.g. although FIG. 2A is presented in black-and-white, example indicia 266 was originally presented in a green color). An example activity stream 270 showing activity items 272 which correspond to recent additions of comments, discussions, pins, and the like is also rendered.

Returning to FIG. 1, comment system 120 may provide a comment addition system 129. Comment addition system 129 allows a user to provide a comment and/or begin a discussion associated with a resource 132. Comment addition system 129 receives particulars relating to a comment and/or discussion from user 102 via user interface 112 and associates the resulting comment and/or discussion to an element of resource 132 (e.g. by determining metadata corresponding to that element). This association may performed, in part, by mapper 126. In some embodiments, comment addition system 129 may provide rendering information describing a comment addition interface to browser renderer 118 (optionally via discussion renderer 128). In some embodiments, and/or in some circumstances, comment addition system 129 may not be provided or may be inactive. For example, comment system 120 may require users to log in to leave comments, and may permit users who are not logged in to view (but not add) comments.

Figure 3:
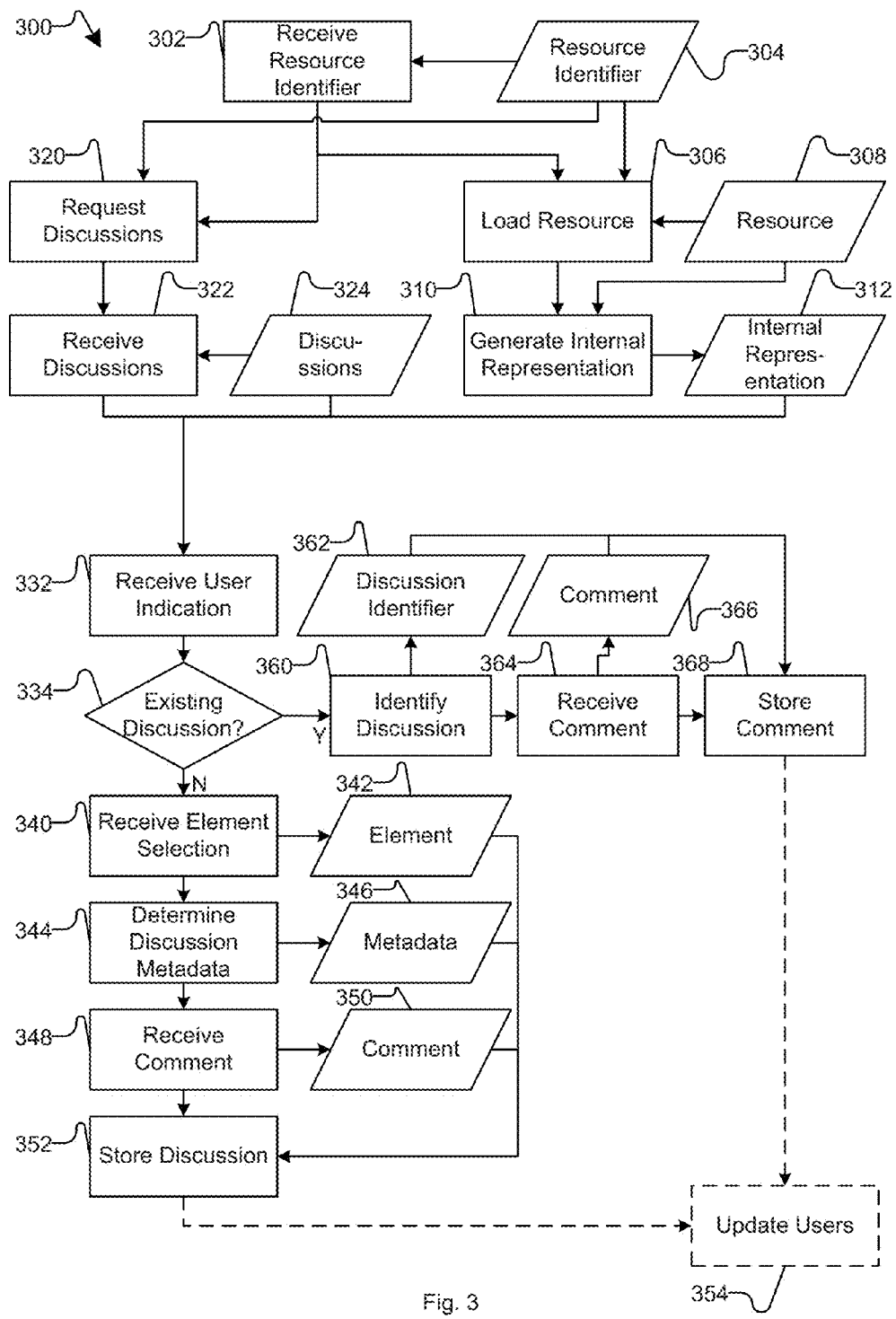
FIG. 3 is a schematic representation of an example comment adding method according to a particular embodiment of the present disclosure.

FIG. 3 schematically illustrates an example comment adding method 300 which may be performed by computer system 100 (e.g. at comment addition system 129) according to a particular embodiment. Steps 302, 304, 306, 308, 310, 312, 320, 322, and 324 correspond to steps 202, 204, 206, 208, 210, 212, 220, 222, and 224 of method 200 in FIG. 2, respectively.

At step 332, computer system 100 receives an indication from a user (e.g. user 102) that a comment or a discussion is to be added. For example, a user may select a control provided by user interface 112 which corresponds to adding a comment or a discussion. Such a control may, for example, take the form of a button, which a user may click on with a computer mouse or trackpad, press via a touch or mechanical interface, and/or otherwise select via user interface 112. In response to receiving such indication, computer system 100 may proceed to step 334.

At step 334, computer system 100 determines whether or not the user has indicated that a comment is to be added to an existing discussion. If so, computer system 100 proceeds to step 360. If not (i.e. if the comment will be the start of a new discussion), computer system 100 proceeds to step 340. In some embodiments, step 334 is performed simultaneously or in parallel with step 332. For example, user interface 112 may provide separate controls for creating discussions and for adding comments to existing discussions, so that a user indication (e.g. selecting the create-discussion control) also acts as a determination for the purposes of step 334.

At step 340, computer system 100 receives from a user a selection of an element, which is represented by element data 342. For example, the user may select an element of resource 308 through user interface 112 by selecting a representation of that element generated by browser renderer 118 (e.g. by clicking on the rendered representation of the element with a computer mouse and/or the like). Element data 342 may comprise, for example, an element of internal representation 312 (e.g. a node in a document object model tree) and/or an identifier corresponding to such an element (e.g. a pointer to a node in a document object model tree). For example, a user may select a block of text by highlighting the text (e.g. via a keyboard, mouse, touch interface, or the like), and element data 342 may represent that text and/or an element containing that text (such as a <P> tag in an HTML resource 308). Having identified the selected element with element data 342, computer system 100 may then proceed to step 344.

At step 344, computer system 100 determines metadata 346 based on element data 342, resource 308, user input, and/or other data. For example, in the case of an HTML resource 308, selected text may be contained by a paragraph <P> tag with certain attributes. Metadata 346 may represent the type of the tag (<P>), some or all of its attributes, a copy of (or reference to) the text selected by the user, and/or the like. Metadata 346 may comprise any of the metadata discussed above, including the time and date the discussion was created, a color associated with the discussion (which, for example, the user may select), visibility settings for the discussion, information identifying the user creating the discussion, the location of resource 308, a snapshot of the associated element, a graphical location of the discussion relative to the associated element, and/or other data. For example, the user may input and/or otherwise provide information such as related topics indexed by computer system 100, tags to associate with the discussion (which may comprise user-generated text and/or predefined text), and/or the like for inclusion in metadata 346.

For instance, a discussion may be associated with a topic provided by the user who created the discussion, such as "Global warming is becoming more and more problematic, what do you think?". The same user (and/or other users, in some embodiments) may input tags such as "warming", "global warming", "concern", "universe", and/or the like. In some embodiments, tags are selected from a pre-determined list maintained by computer system 100. System 100 may similarly enable creators of items other than discussions, such as pins, to associate such items with tags. System 100 may store all such tags and allow users to search for particular tags to find related contents or posts. For instance, if a user creates a pin with a tag such as "politics", the user may share the pin. Other users may view the pin and select the "politics" tag, in response to which system 100 may display items with the same and/or related tags. System 100 may also identify the creators of those items, and thereby assist users in finding other users who have shared related content.

As noted above, metadata 346 may comprise a graphical location of a discussion relative to its associated element. In some embodiments, such a graphical location comprises a position of the discussion (e.g. 20 pixels to the left and 10 pixels up from the top-left corner of the associated <IMG> element) and a resolution of the user's display. This information may be used when rendering the discussion on displays with different resolutions, as the position of the discussion relative to its associated element may be scaled to account for differences in resolution. In some embodiments, a graphical location may comprise resolution-invariant information, such as distances in millimeters, points, pica, inches, and/or the like. In some embodiments, a graphical location may comprise user interface information such as the position of a scrollbar of the discussion's creator at the time that the discussion was created.

In some embodiments, metadata 346 may comprise timing data. For example, a discussion may be associated with an element which allows computer system 100 to output content with timing data (sometimes referred to as "playing" content), such as a <VIDEO> or <AUDIO> tag in an HTML resource 308, an embedded video or audio object (e.g. embedded via an <OBJECT> tag), an animated image represented by an <IMG> tag, and/or the like. Discussions may be rendered based on timing data in metadata 346. For example, discussions may be rendered at certain times while video or audio is played.

For example, metadata 346 relating to such discussions may comprise a time range (e.g. represented as a start time and an end time), and computer system 100 may render a discussion when the discussion's associated element is playing content within that time range and not at other times. For instance, rendering of a discussion may be restricted to a certain scene in a film or a certain verse in a song. As another example, metadata 346 may comprise a trigger time, and computer system 100 may render a discussion when the discussion's associated element plays content at that time (and/or at a later time), after which computer system 100 may continue to render the discussion regardless of the state of the associated element. For instance, a discussion with "spoilers" may only be displayed after a certain scene is shown, but thereafter may continue to be rendered even if the user rewinds to an earlier scene. As a further example, metadata 346 may indicate that a discussion is only to be rendered while the associated element is paused, and/or after the associated element has been played in its entirety. For instance, a discussion associated with an animated image may be rendered only after the first "loop" of the animation has completed.

Once metadata 346 has been determined, computer system 100 may proceed to step 348. In some embodiments, step 348 occurs prior to, or in parallel with, step 344 and/or step 340.

At step 348, the user provides a comment 350. Comment 350 will be associated with a new discussion, the new discussion being associated with the selected element. Comment 350 may comprise text, images, audio, and/or other content storable in discussion database 122 and/or a related database. Once the user has provided a comment 350 and confirmed its submission, computer system 100 proceeds to step 352.

At step 352, computer system 100 generates a new discussion with associated metadata 350 and stores it in discussion database 122. Computer system 100 also stores comment 350 in discussion database 122 and/or a related database. An example architecture of a discussion database 122 is described in greater detail below, with reference to FIG. 4. Computer system 100 may, optionally, proceed to step 354.

At step 354, computer system 100 provides updates to other users for whom resource 308 is currently being provided at user interfaces 112 (e.g. users browsing the same page as the user submitting a new discussion and/or comment). For example, computer system 100 may transmit the new discussion to the browsers 110 and/or comment systems 120 of other users using real-time communication (which, for purposes of this disclosure and the appended aspects, includes substantially real-time communication, even in cases where communication is delayed by lag, technical limitations of the network, and the like). For example, comment system 120 may implement sockets (or socket-like processes) using JavaScript to receive updated information from discussion database 122 after comment system 120's initial request for discussion information. Discussion database 122 may send notifications of new discussions, comments, and/or other activity associated with a resource 308 to all browsers 110 which are currently rendering that resource 308. In some embodiments, discussion database 122 only sends notifications of new activity to browsers 110 the new activity is visible to the associated users 102 (based on the privacy settings of the activity, if any).

Returning to step 334, computer system 100 proceeds to step 360 if the user is adding a comment to an existing discussion, as described above. At step 360, computer system 100 identifies the discussion to which the user is adding a comment, and consequently generates discussion identifier 362. For example, a user may indicate that a comment should be added to a particular discussion by selecting the discussion (e.g. with a click of a computer mouse) and entering a comment into a comment-entering field associated with that discussion. Computer system 100 then proceeds to step 364. In some embodiments, computer system 100 performs step 360 in parallel with step 364 (e.g. both may be performed upon a user submitting a comment).

At step 364, the user provides a comment 366. Comment 366 will be associated with the discussion identified by discussion identifier 362. It may not be necessary for computer system 100 to identify the element associated with that discussion. Comment 366 may comprise text, images, audio, and/or other content storable in discussion database 122 and/or a related database. Once the user has provided a comment 366 and confirmed its submission, computer system 100 proceeds to step 368.

At step 368, computer system 100 stores comment 366 in discussion database 122 and/or a related database. Comment 366 is associated with the discussion identified by discussion identifier 362; for example, a record in a database representing comment 366 may comprise a foreign key identifying a record in a database representing the discussion. An example architecture of a discussion database 122 is described in greater detail below, with reference to FIG. 4. Computer system 100 may, optionally, proceed to step 354, as described above with reference to step 352.

Figure 3A:
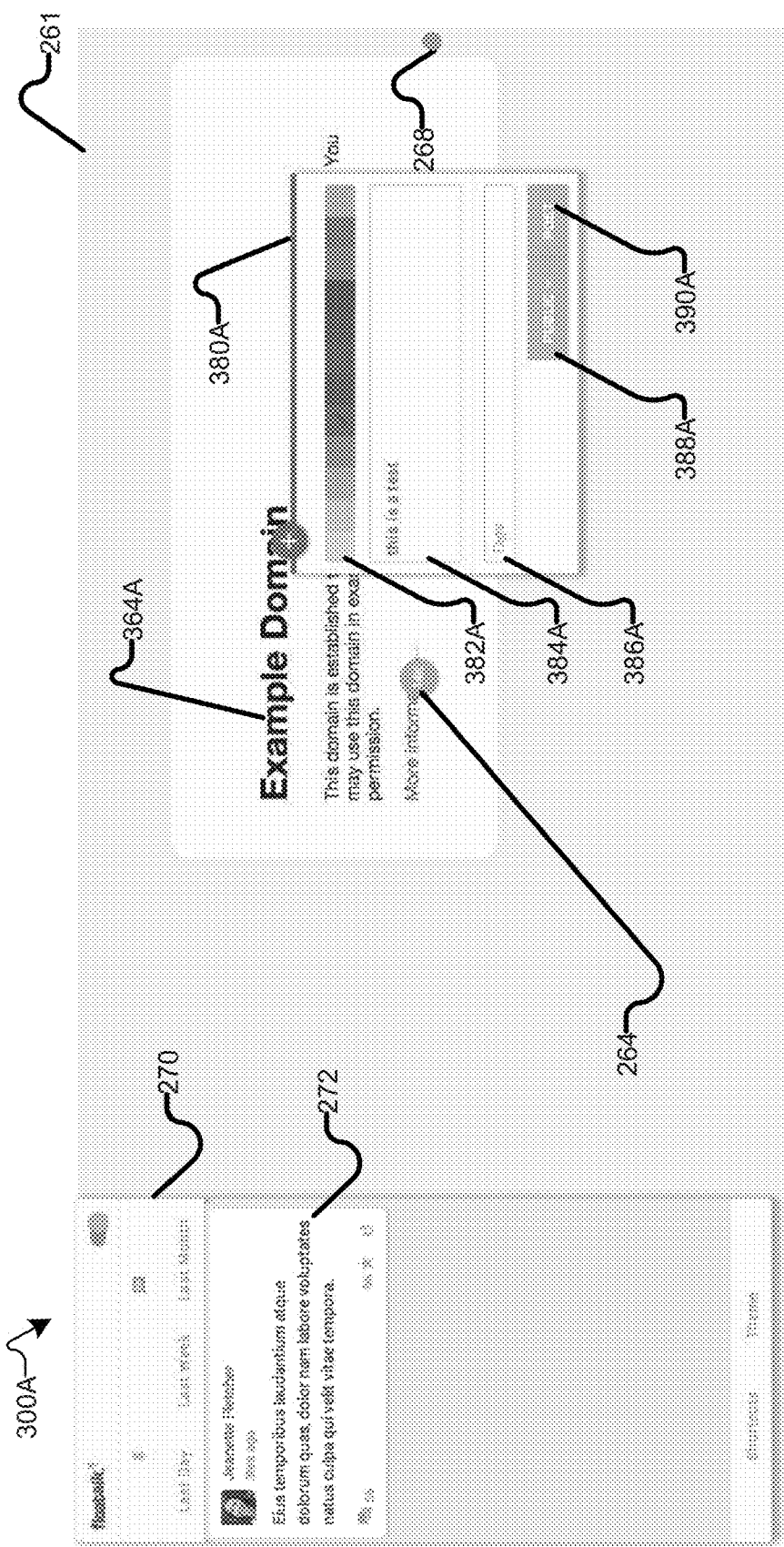
FIG. 3A is an example rendering of discussions on an example webpage before the addition of a new comment and discussion according to a particular embodiment of the present disclosure.

FIG. 3A illustrates an example of a rendering 300A of discussions 324 (i.e. existing discussions) associated with the example webpage 261 of FIG. 2A. Rendering 300A includes an example discussion-creation interface element 380A. Similar to discussion 262 associated with element 264, interface element 380A may enable a user to add a discussion and associate it with an element 364A (in this case, some title text). The user may select a color for the new discussion at color selector 382A, provide text for the new discussion at text field 384A, provide tags for the discussion at tag field 386A, select privacy settings at privacy selector 388A, and/or choose to create the discussion with the selected settings and content by selecting posting interface element 390A.

Figure 3B:
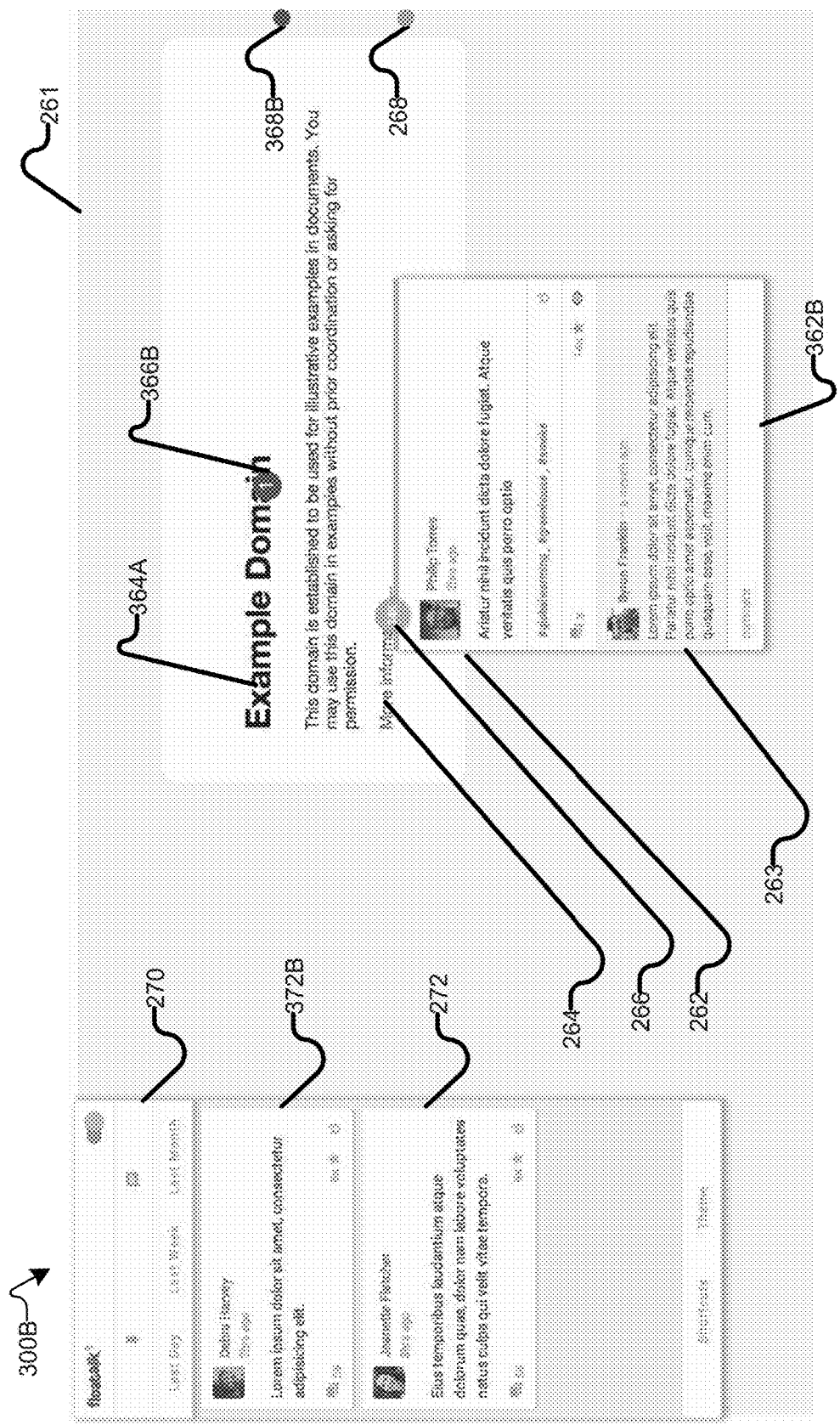
FIG. 3B is an example rendering of discussions on the example webpage of FIG. 3A after the addition of a new comment and discussion according to a particular embodiment of the present disclosure.

FIG. 3B illustrates an example of a rendering 300B of example webpage 261 after the addition of a new discussion. Activity item 272 corresponds to an item already in the discussion associated with indicia 264, whereas activity item 372B corresponds to the addition of a new comment (e.g. comment 366) which has been added to a discussion on webpage 261. FIG. 3B shows an additional discussion 366B (which, in this example, is collapsed so that only its indicia is visible) which has been added as described above. Further indicia 368B is also shown, similarly to indicia 268. The rendering of discussion 262 may include a comment addition interface element 362B which permits a user to insert comment text and submit the comment (e.g. by selecting a user interface element, by providing suitable input to a keyboard or other input device, etc.).

Figure 4:
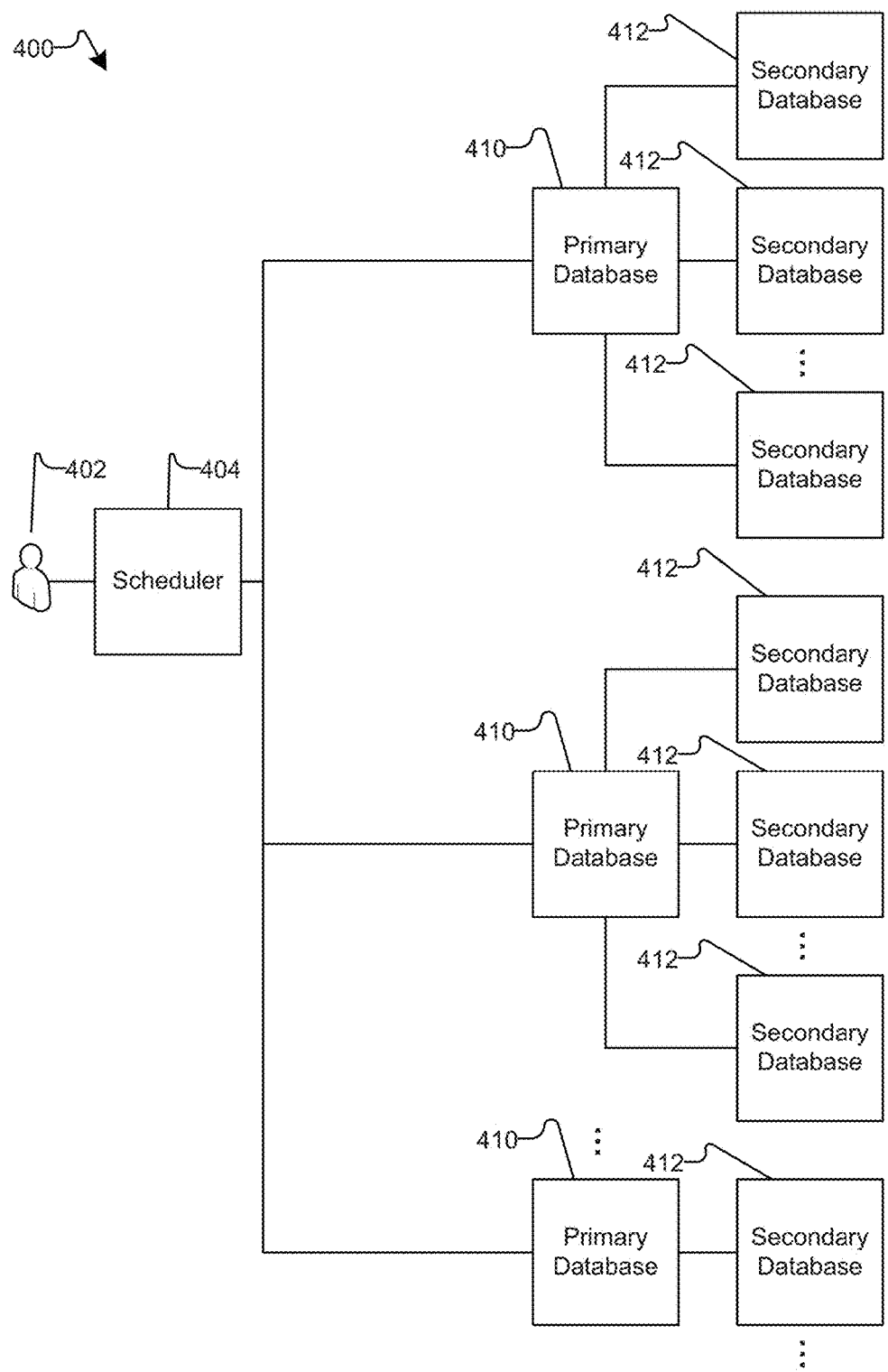
FIG. 4 is a schematic representation of an example architecture for the computer system of FIG. 1 according to a particular embodiment of the present disclosure.

FIG. 4 is a schematic representation of an example architecture for computer system 100, and in particular shows an architecture for discussion database 122 of comment system 120. In FIG. 4, user 402 represents a client (e.g. browser 110 and components of comment system 120 implemented as a browser plugin or otherwise provided locally at the client). When the client makes a request for a discussion and/or its associated comments (e.g. at steps 220, 320), that request may be received by a scheduler 404. Scheduler 404 may comprise one or more processors. For example, scheduler 404 may comprise a distributed computing service designed to spread out client requests over time to avoid incapacitating a database server with a sudden spike in requests. A non-limiting example of such a service includes the Amazon™ Elastic Load Balancing™ service.

Scheduler 404 may distribute requests for discussions and/or comments to their appropriate databases 410, 412. In some embodiments, each resource is associated with an index, such as a domain name, reference, tag, and/or the like. Each index may be associated with a specific primary database 410. For example, a particular primary database 410 may host all discussions associated with the domain "example.com". In such an example, a request for discussions associated with a resource 132, 208, 308 (FIGS. 1-3) located at www.example.com/resource.html would be directed to the primary database 410 which hosts discussions associated with "example.com". Some non-limiting examples of indices include: a hash of an address of the resource, subdomains associated with the resource, substrings of an address of the resource (e.g. all domains beginning with "z" may be hosted at one primary domain 410, whereas domains beginning with "ea" and "er" may be hosted at different primary databases 410), and/or other values. In some embodiments, other indices may be used to allocate discussions to primary databases 410.

Scheduler 404 may also, or alternatively, allocate new discussions to particular databases 410, 412. For example, scheduler 404 may allocate new discussions to each primary database 410 in round robin order (i.e. each primary database 410 may be allocated a new discussion in turn before returning to the first primary database 410). In some embodiments, each primary database 410 has an associated priority value. Primary databases 410 with higher priority values are allocated new discussions with greater frequency than primary databases 410 with relatively lower priority values. When a primary database 410 is allocated a discussion, particulars relating to the discussion and/or its comments may be stored in primary database 410 and further particulars relating to the discussion and/or its comments may be stored in secondary databases 412.

Primary and secondary databases 410, 412 may be arranged in a tree structure, as illustrated in FIG. 4. In some embodiments, discussions are allocated to primary databases 410 based on the addresses and/or other indices of their associated resources 132, 208, 308 (as described above). Comments associated with such discussions may be allocated to secondary databases 412 depending from primary databases 410 (as shown in FIG. 4) based on information relating to their associated discussions. For example, each discussion in primary database 410 may be provided a unique identifier ("ID") provided by the database system. These identifiers may be used to determine which secondary database 412 receives comments associated with particular discussions; for instance, a secondary database 412 may be identified using modulo arithmetic (optionally after hashing the discussion ID).

In some embodiments, discussion and comment data is "sharded" across databases 410, 412 so that primary databases 410 send write requests to secondary databases 412 and synchronize data between its dependent databases 412. For example, databases 410, 412 may comprise MongoDB™ or other distributed databases and may perform data sharding according to the MongoDB™ or other database software.

Primary and secondary databases 410, 412 may be implemented using suitable database software and computer hardware. For example, such databases may be implemented with SQL database software and suitable computer hardware. Alternatively, or in addition, such databases may be implemented using NoSQL software (such as, for example, MongoDB™) and suitable computer hardware. Some information relating to a discussion may be stored externally from primary and secondary databases 410, 412. For example, snapshots of elements taken when a discussion is created may be stored on an external server (not shown) and addresses of such snapshots may be stored in primary and/or secondary databases 410, 412.

Figure 5:
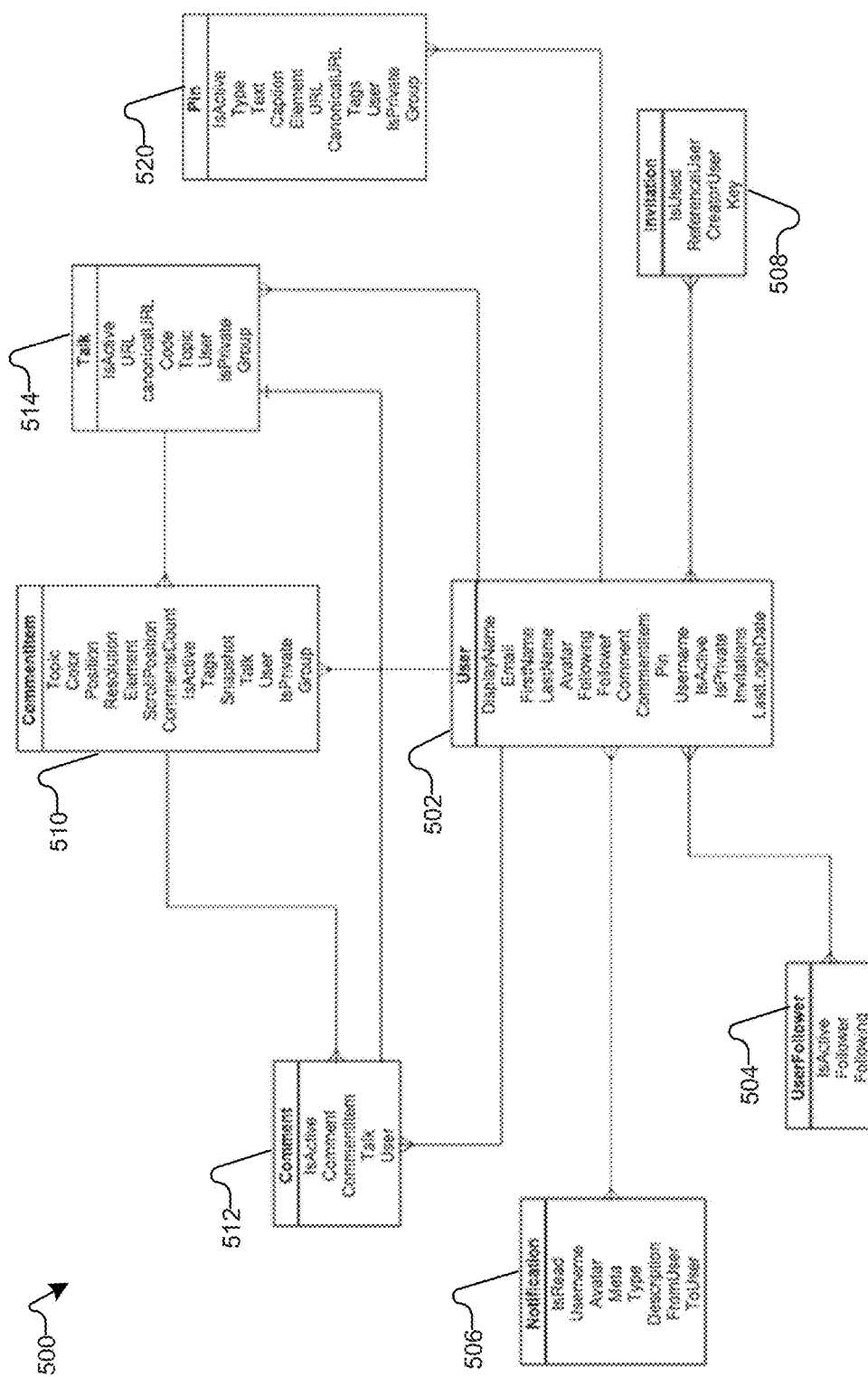
FIG. 5 is an entity relationship diagram illustrating an example database structure according to a particular embodiment of the present disclosure.

FIG. 5 is an entity relationship diagram illustrating a database 500 which may be provided by discussion database 122, primary database 410, and/or secondary database 412 according to an example embodiment. Database 500 provides a user table 502 which contains user particulars (e.g. a user's name, display name, avatar, recent comments and discussions, and so on). Database 500 may provide social information about users. In the depicted embodiment, users may "follow" other users; such relationships between users may be represented in user follower table 504. Users who mutually follow each other may be said to be "friends". Users may follow or be followed by many other users.

Database 500 may provide administrative information for users, such as notifications (represented in notification table 506) and invitations (represented in invitation table 508). Certain events, such as the addition of comments by users which a user follows, may result in the creation of entries in notification table 506 which may describe the particular activity giving rise notification, the user who performed that activity, and these are to be notified. Some of the notifications in notification table 506 may be provided to users by computer system 100. For example, a user may be notified (using information from notification table 506) when one of their friends or someone they follow makes a comment. In some embodiments, users may issue invitations, which may permit and/or encourage other parties to create user accounts (represented in user table 502). If a invited party does create a user account based on invitation, the created user account may be indicated in a field of the corresponding entry of invitation table 508. Users may be associated with many notifications and/or invitations, subject to constraints imposed by computer system 100 (e.g. each user may have a limited number of invitations to issue).

As described above, users may add discussions and/or comments to database 500. Discussions may correspond to entries in discussion table 510 (referred to in FIG. 5 as comment item table 510), and may be represented as discussed above. Comments may correspond to entries in common table 512, and may bear presented as discussed above. Each discussion may comprise many comments, but each comment corresponds to a single discussion.

Each discussion in discussion table 510 may comprise a privacy setting (e.g. represented by the "IsPrivate" field). The setting may determine whether the discussion and its associated comments in common table 512 are public (i.e. visible to all users) or private (i.e. visible only to certain users, such as users followed by the user who created the discussion, or visible only to the user who created the discussion). Similarly, users (as represented in user table 502) may set their user accounts to be public or private; activity by private user accounts (such as discussions, comments, and/or pins) may only be visible to the user and/or, depending on the user's privacy settings, to the user's followers.

System 100 may provide a privacy hierarchy. Privacy settings of a user in user table 502 may be applied first, so that all activity by a user with a private account is necessarily also private, even if individual activity is provided with a public (or less-private) privacy setting. For example, if a user has set his or her account to be visible only to themselves, posts which are set to be visible only to followers may only be visible to the user (and not the user's followers). Similarly, the privacy settings of a discussion in discussion table 510 may be further restricted by the privacy settings of its associated talk item in talk table 514. Pins in pin table 520 may similarly be provided with privacy settings substantially as described above.

Database 500 may provide a talk table 514. Each entry in talk table 514 may identify a resource (e.g. at "canonicalURL" and/or URL fields) and may be associated with any number of discussions. For example, an entry in talk table 514 may be associated with all of a particular user's public discussions associated with the resource http://example.com/index.html. Computer system 100 may then locate all discussions associated with a particular resource by querying database 500 for all entries in talk table 514 is associated with that resource and having suitable privacy attributes (which may be a relatively slow query, since the URL or other index of the resource may be lengthy) and subsequently (or simultaneously, e.g. as part of a complex query or batch query) querying database 500 for all entries in discussion table 510 associated with the located entries in talk table 514.

In addition to, or as an alternative to, adding discussions and/or comments, users may "pin" elements of a resource

132, 208, 308. As with adding a discussion or comment, a user may select an element in a resource 132, 208, 308. However, instead of creating a discussion or comment, the user may add an entry to pin table 520. Entries of pin table 520 (called "pins") may optionally comprise a caption provided by the user. Entries of pin table 520 may further be associated with metadata in a manner similar to comments and discussions discussed above. For example, pins may be associated with tags, particular element types and attributes, textual content, images, audio, video, resource addresses, and the like. A user may create many pins.

In some embodiments, computer system 100 provides an activity stream for some or all of the users in user table 502. An activity stream may display a user's comments, new discussions, and/or pins. These comments, new discussions, and/or pins may be displayed, for example, in chronological order, beginning with the most recent comment, new discussion, or pin (based on creation date information in tables 510, 512, 520, not shown). Comments, new discussions, and/or pins may optionally be displayed separately from each other.

Activity streams may be provided in the form of a personal profile for each user represented in user table 502. Elements of a personal profile may be provided as "cards", each card providing information relating to an activity (i.e. a comment, new discussion, or pin) by the user. Information provided by a card may comprise, for example: text associated with a comment, discussion, or pin; the date that the activity was performed; the resource that the activities associated with; an indication of the number of comments associated with a discussion (when the activity is a discussion); a color selected by the user when a discussion was added (e.g. shown as a border of the card rendered in the selected color).

Accordingly, a user may be able to view another user's comments, discussions, and pins across a plurality of resources (and, potentially, across a plurality of domains and services). Users' view of other users' activity streams may be restricted by computer system 100 according to visibility data associated with the users and/or the activities. For example, comments and/or discussions may be public or private, as described above. Private comments and/or discussions may only be visible to a particular user if that user is followed by the activity streams' owner (as are presented in user follower table 504).

In some embodiments, system 100 may allow users to choose an element in a resource and specify that the element is to be tracked. System 100 may store some or all of the content of the tract element in a database 410, 412. System 100 may further detect changes in the content of the tracked element (e.g. by periodically polling the resource at a particular frequency, and/or by receiving reports of the contents of the resource from users when users load the resource) and may store changes to that content in database 410, 412. System 100 may alert users of changes, for example by displaying notices of changes on a central website (e.g. the same website providing the users' profile for system 100). For instance, a user can specify that the price of a mobile phone should be tracked on a particular e-commerce webpage. System 100 may check the price of the mobile phone on that e-commerce webpage and, if a change is detected, the updated price may be stored in database 410, 412.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Computer system 100 and/or components thereof (including, for example, one or more processors) may comprise hardware, software, firmware or any combination thereof. Computer system 100 may comprise one or more microprocessors, digital signal processors, graphics processors, field programmable gate arrays, and/or the like. Components of computer system 100 may be combined or subdivided, and components of computer system 100 may comprise sub-components shared with other components of computer system 100. Components of computer system 100 may be physically remote from one another. For example, all or part of comment system 120 may be instantiated in a programmed server computer, which communicates with a browser 110 via the internet or another network. For brevity, computer system 100 is described in some instances herein as though it comprises a client side computer system; however, it will be understood that some or all of the features and/or steps of methods described herein could be implemented by a server side computer system.

Where a component is referred to above (e.g., a system, display, processor, etc.), unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

It is therefore intended that any claims herein or hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for communicating comments over a computer network, the method performed by a processor and comprising:
   receiving a resource identifier identifying a resource;
   communicating, over the computer network, the resource identifier to a discussion database;
   receiving, over the computer network, a discussion associated with the resource from the discussion database, the discussion associated with metadata comprising one or more criteria;
   obtaining a representation of the resource;
   determining a first criteria subset, the first criteria subset comprising at least one of the one or more criteria;
   determining a first element subset, the first element subset comprising elements of the representation of the resource which satisfy the criteria of the first criteria subset;
   determining whether the discussion can be mapped to at least one element of the first element subset;
   if it is determined that the discussion can be mapped to at least one of the elements of the first element subset:
      determining a mapping between the discussion and at least one of the elements of the first element subset; and
      displaying to a user a rendering of the discussion based on the mapping;
   wherein determining whether the discussion can be mapped to at least one of the elements of the first element subset comprises:
   determining a number m of elements in the first element subset which satisfy the criteria of the first criteria subset;
   if the number m is 1, determining that the discussion can be mapped to at least one of the elements of the first element subset;
   if the number m is 0, determining that the discussion cannot be mapped to at least one of the elements of the first element subset; and
   if the number m is 2 or more:
      determining a second criteria subset of the one or more criteria;
      determining a second element subset, the second element subset comprising elements of the representation of the resource which satisfy the criteria of the second criteria subset, the second element subset comprising a subset of the first element subset; and
      determining whether the discussion can be mapped to at least one element of the second element subset.

2. A method according to claim 1 wherein, if it is determined that the discussion cannot be mapped to at least one of the elements of the first element subset, the method further comprises providing an indication to the discussion database, over the computer network, that the discussion could not be mapped.

3. A method according to claim 1 wherein the second criteria subset comprises the elements of the first criteria subset and at least one criteria of the one or more criteria not in the first criteria subset.

4. A method according to claim 1 wherein at least one of the criteria of the second criteria subset is a refined criterion corresponding to an initial criterion of the first criteria subset, the refined criterion satisfied by a subset of elements of the representation of the resource which are satisfied by the initial criterion.

5. A method according to claim 4 wherein the initial criterion comprises a locational attribute and the refined criterion comprises the locational attribute and additional parameters.

6. A method according to claim 1, the method comprising iteratively determining criteria subsets until at least one of the following occurs:
   determining that the discussion can be mapped to at least one of the elements of the first element subset; and
   determining that more than 2 elements satisfy all of the one or more criteria and, in response to said determination, determining that the discussion cannot be mapped to at least one of the elements of the first element subset.

7. A method according to claim 1 wherein:
   determining whether the discussion can be mapped to at least one element of the first element subset comprises determining a ranking of the elements of the first element subset based on one or more ranking criteria; and
   determining a mapping between the discussion and at least one of the elements of the first element subset comprises determining a mapping between the discussion and at least one of the elements of the first element subset based on the ranking.

8. A method according to claim 1, the method further comprising:
   receiving, from a user, an input indicating that a discussion is to be added;
   receiving, from a user, a selection of an element in the representation of the resource;
   determining a set of metadata based on the element;
   receiving, from a user, a comment;
   communicating, to the discussion database, an indication that a discussion is to be created, the set of metadata, and the comment.

9. A method according to claim 8 the method further comprising communicating, over the computer network, an update to a plurality of users viewing the resource, the update comprising information communicated to the discussion database.

10. A method according to claim 1, the method further comprising:
    receiving, from a user, an input indicating that a comment is to be added;
    receiving, from a user, a selection of a discussion associated with the resource;
    receiving, from a user, a comment;
    communicating, to the discussion database, an indication that a comment is to be added to the selected discussion.

11. A system for communicating comments over a computer network, the system comprising one or more processors configured to perform the method of claim 1.

12. A method for communicating comments over a computer network, the method performed by a processor and comprising:
   receiving a resource identifier identifying a resource;
   identifying a discussion associated with the resource from within a discussion database, the discussion associated with metadata comprising one or more criteria;
   determining a first criteria subset, the first criteria subset comprising at least one of the one or more criteria;
   determining a first element subset, the first element subset comprising elements of a representation of the resource which satisfy the criteria of the first criteria subset;
   determining that the discussion can be mapped to at least one element of the first element subset; and
   causing a rendering of the discussion based on the mapping to be displayed to a user along with the representation of the resource;
   wherein determining that the discussion can be mapped to at least one element of the first element subset comprises:
   determining a number m of elements in the first element subset which satisfy the criteria of the first criteria subset;
   if the number m is 1, determining that the discussion can be mapped to at least one of the elements of the first element subset;
   if the number m is 0, determining that the discussion cannot be mapped to at least one of the elements of the first element subset; and
   if the number m is 2 or more:
      determining a second criteria subset of the one or more criteria;
      determining a second element subset, the second element subset comprising elements of the representation of the resource which satisfy the criteria of the second criteria subset, the second element subset comprising a subset of the first element subset; and
      determining that the discussion can be mapped to at least one element of the second element subset.

13. A method according to claim 12 comprising determining that the discussion cannot be mapped to at least one of the elements of the first element subset and flagging the discussion as a missed indication.

14. A method according to claim 12 wherein the second criteria subset comprises the elements of the first criteria subset and at least one criteria of the one or more criteria not in the first criteria subset.

15. A method according to claim 12 wherein at least one of the criteria of the second criteria subset is a refined criterion corresponding to an initial criterion of the first criteria subset, the refined criterion satisfied by a subset of elements of the representation of the resource which are satisfied by the initial criterion.

16. A method according to claim 15 wherein the initial criterion comprises a locational attribute and the refined criterion comprises the locational attribute and additional parameters.

17. A method according to claim 12, the method comprising iteratively determining criteria subsets until at least one of the following occurs:
   determining that the discussion can be mapped to at least one of the elements of the first element subset; and
   determining that more than 2 elements satisfy all of the one or more criteria and, in response to said determination, determining that the discussion cannot be mapped to at least one of the elements of the first element subset.

18. A method according to claim 12 wherein:
   determining whether the discussion can be mapped to at least one element of the first element subset comprises determining a ranking of the elements of the first element subset based on one or more ranking criteria; and
   determining a mapping between the discussion and at least one of the elements of the first element subset comprises determining a mapping between the discussion and at least one of the elements of the first element subset based on the ranking.

19. A method according to claim 12, the method further comprising:
   receiving, from a user computing system: an input indicating that a discussion is to be added, a comment, a selection of an element in the representation of the resource and set of metadata based on the element;
   adding, to the discussion database, the discussion, the comment and the set of metadata.

20. A method according to claim 19, the method further comprising communicating, over the computer network, an update to a plurality of users viewing the resource, the update comprising information communicated to the discussion database.

21. A method according to claim 12, the method further comprising:
   receiving, from a user computing system, an input indicating that a comment is to be added, a comment and a selection of a discussion associated with the resource; and
   adding the comment to the selected discussion in the discussion database.

22. A computer program product comprising a non-transient computer-readable medium having computer-readable instructions thereon, which when executed by a suitably configured processor cause the processor to perform the method of claim 1.

* * * * *